United States Patent
Kollmuss et al.

(10) Patent No.: US 11,485,586 B2
(45) Date of Patent: *Nov. 1, 2022

(54) APPARATUS AND METHOD FOR HANDLING PIECE GOODS MOVED ONE AFTER ANOTHER

(71) Applicant: KRONES Aktiengesellschaft, Neutraubling (DE)

(72) Inventors: Manuel Kollmuss, Raubling (DE); Erhard Beer, Ebbs (AT); Michael Astner, Brannenburg (DE); Arsalan Mehdi, Rosenheim (DE)

(73) Assignee: KRONES Aktiengesellschaft, Neutraubling (DE)

( * ) Notice: Subject to any disclaimer, the term of this patent is extended or adjusted under 35 U.S.C. 154(b) by 635 days.

This patent is subject to a terminal disclaimer.

(21) Appl. No.: 16/467,562

(22) PCT Filed: Feb. 21, 2017

(86) PCT No.: PCT/EP2017/053885
§ 371 (c)(1),
(2) Date: Jun. 7, 2019

(87) PCT Pub. No.: WO2018/108326
PCT Pub. Date: Jun. 21, 2018

(65) Prior Publication Data
US 2020/0039756 A1    Feb. 6, 2020

(30) Foreign Application Priority Data
Dec. 13, 2016 (DE) .................... 10 2016 124 250.0

(51) Int. Cl.
*B65G 47/08* (2006.01)
*B25J 9/00* (2006.01)

(52) U.S. Cl.
CPC .......... *B65G 47/086* (2013.01); *B25J 9/0093* (2013.01); *B65G 2203/044* (2013.01)

(58) Field of Classification Search
CPC ........................ B25J 9/0093; B65G 2203/044
See application file for complete search history.

(56) References Cited

U.S. PATENT DOCUMENTS

| 5,123,231 A | 6/1992 | Fallas et al. |
| 7,896,151 B2 | 3/2011 | Meisinger |

(Continued)

FOREIGN PATENT DOCUMENTS

| CN | 103787059 A | 5/2014 |
| CN | 103732515 B | 11/2017 |

(Continued)

OTHER PUBLICATIONS

First Chinese Office Action dated Mar. 16, 2020.
(Continued)

*Primary Examiner* — Lynn E Schwenning
(74) *Attorney, Agent, or Firm* — Simmons Perrine Moyer Bergman PLC

(57) ABSTRACT

The invention relates to an apparatus and a method handling moved piece goods. The apparatus comprises a manipulator for the piece goods, at least one transport device transporting the moved piece goods to a seizing range of the at least one manipulator and at least one horizontal conveying device assigned to the seizing range and/or to a movement range of the at least one manipulator, via which horizontal conveying device the moved piece goods are transported in the seizing range of the at least one manipulator. Furthermore, the apparatus comprises at least one detection device for obtaining space coordinates and/or position data and/or contour data of piece goods to be seized by the manipulator, wherein the at least one horizontal conveying device and the at least (Continued)

one transport device are calibratable and/or controllable based on the space coordinates and/or position data and/or contour data.

18 Claims, 4 Drawing Sheets

(56) References Cited

U.S. PATENT DOCUMENTS

| | | | |
|---|---|---|---|
| 8,448,411 | B2 | 5/2013 | Huber et al. |
| 9,067,741 | B2 * | 6/2015 | Acerbis ............... B65G 47/52 |
| 9,387,992 | B2 | 7/2016 | Boschi et al. |
| 9,475,660 | B2 | 10/2016 | Batrin et al. |
| 11,034,534 | B2 | 6/2021 | Beer et al. |
| 2005/0246056 | A1 | 11/2005 | Marks et al. |
| 2009/0250312 | A1 | 10/2009 | Meisinger |
| 2014/0200712 | A1 | 7/2014 | Batrin et al. |
| 2016/0107782 | A1 | 4/2016 | Hutter et al. |
| 2016/0167889 | A1 | 6/2016 | Scholz et al. |

FOREIGN PATENT DOCUMENTS

| | | |
|---|---|---|
| DE | 60200953 | 9/2004 |
| DE | 19530626 | 9/2008 |
| DE | 102009043970 A1 | 3/2011 |
| DE | 102010020847 A1 | 11/2011 |
| DE | 102012219886 A1 | 5/2014 |
| EP | 1456101 A1 | 9/2004 |
| EP | 1465101 A2 | 10/2004 |
| EP | 1927559 A1 | 6/2008 |
| EP | 2107018 B1 | 6/2011 |
| EP | 2279971 B1 | 5/2012 |
| TW | 336916 B | 7/1998 |
| WO | 2012122632 A1 | 9/2012 |
| WO | 2016087193 A1 | 6/2016 |

OTHER PUBLICATIONS

PCT Application: PCT/EP2017/053885—English Translation of WIPO International Preliminary Report of Patentability dated Jun. 27, 2019.

Priority Application: DE 10 2016 124 250.0 Filed Dec. 13, 2016—German Search Report dated Jun. 25, 2021.

PCT Application: PCT/EP2017/053885 Filed Feb. 21, 2017—International Search Report dated Sep. 8, 2017.

* cited by examiner

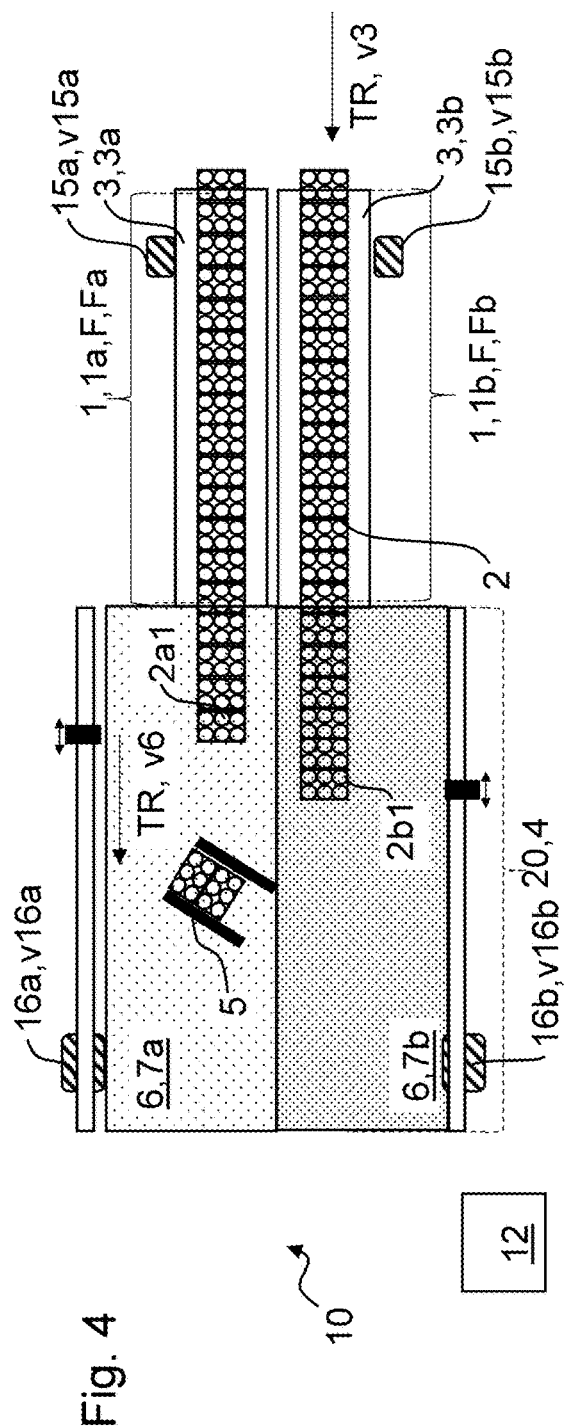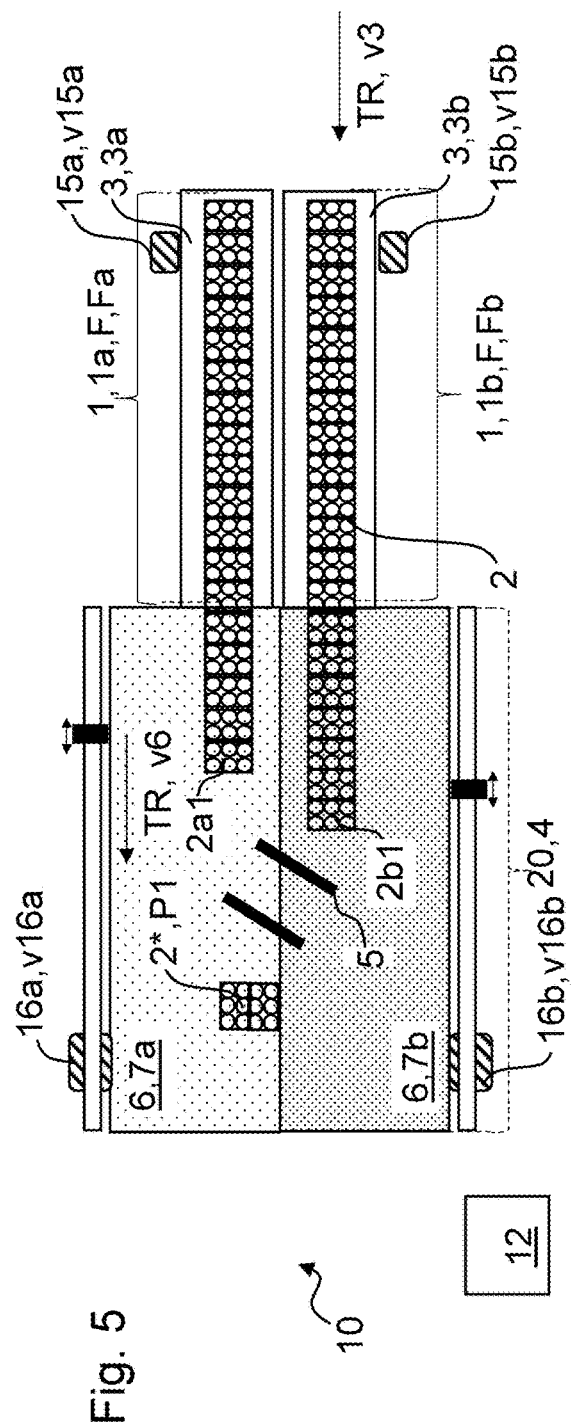

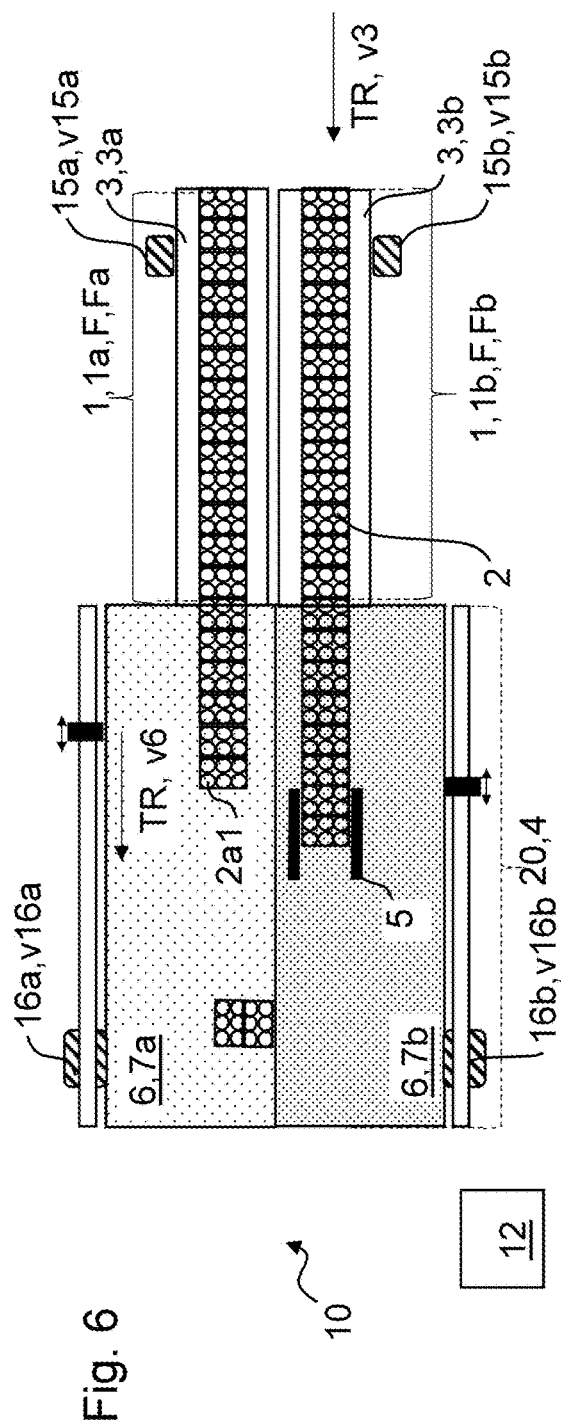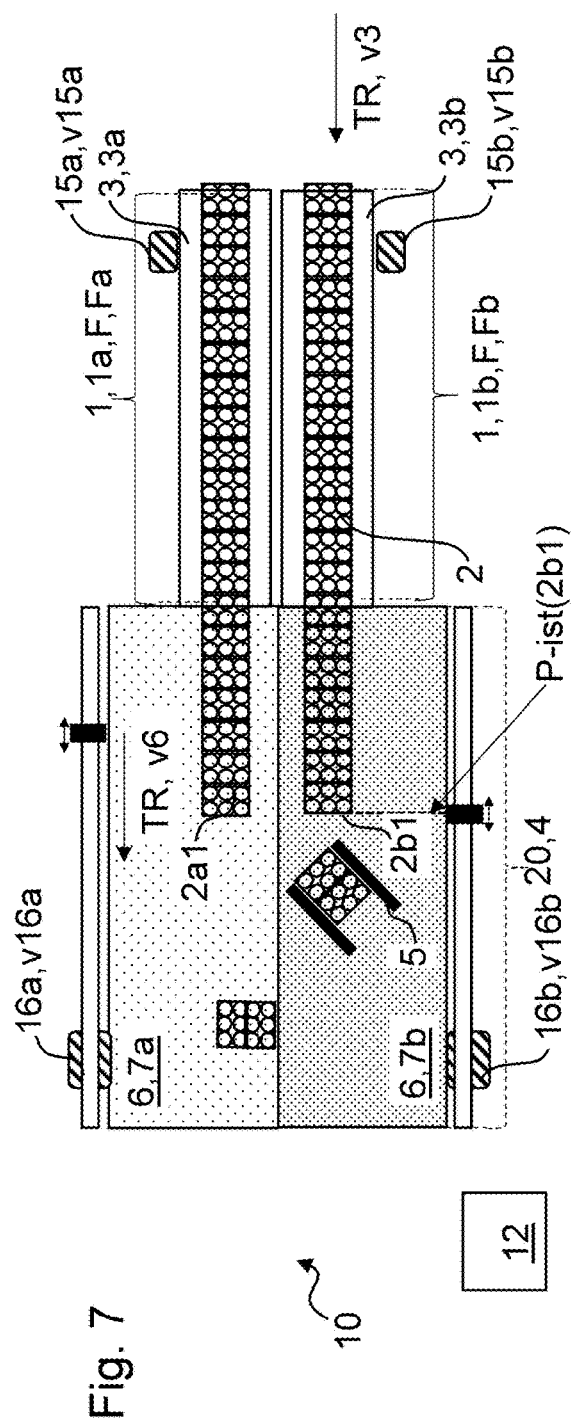

APPARATUS AND METHOD FOR HANDLING PIECE GOODS MOVED ONE AFTER ANOTHER

CLAIM OF PRIORITY

The present application claims priority to International Application PCT/EP2017/053885, filed Feb. 21, 2017, which in turn claims priority to German Application DE 10 2016 124 250.0, filed Dec. 13, 2106, which are incorporated by reference.

FIELD OF THE INVENTION

This invention concerns an apparatus and a method for handling piece goods one moved after the other.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful with facilities for treating beverage containers. The piece goods in question can be, for example, packages, crates, cartons, bundles, or other clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by a velocity difference between dosing belt and transport belt; a control by optical sensors, for example light barriers, can additionally be in place. It is likewise conceivable to convey the piece goods in a spaced-apart manner from the transport belt by operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods can also be rotated on the transport belt according to the desired layer pattern in order to then be delivered to the layer-forming belt.

Prior art knows different embodiment variants for designing grouping tables that serve to bring together piece goods, such as cartons, shrink packs, trays or plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in each required position mechanically by stop points. The piece goods positioned in such a way can then be pushed off from the roller conveyor in a direction orthogonal to the transport direction. Supplying, arranging, and pushing off the piece goods can in this context be regarded as a cycle. At least one such cycle is needed to assemble one layer, normally, however, a plurality of such cycles are needed to generate a layer. The partly discontinuous conveyance with its relatively abrupt speed changes or direction changes causes accordingly high mechanical stress on the piece goods, which is possibly detrimental to product-protective processing of the piece goods.

Document EP 1 465 101 A2 discloses an apparatus for forming rows from packaging goods for bundle palletizers. The bundle palletizer comprises at least one layer generating station and at least one palletizing station. The row forming apparatus comprises at least one positioning station, on which the packaging goods are arranged at desired spaces in at least one row during the transport. The positioning station connects to a staging conveyor associated with the layer generating station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially as many belts are required for forming the spaces and/or for rotating the packaging goods.

An apparatus is known from U.S. Pat. No. 5,123,231 A for assembling articles into groups and subsequently packaging them. On a feeder belt and in each instance with predefined spaces, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, disposed downstream therefrom and cyclically drivable a step conveyor, disposed laterally next thereto a layer-forming station, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. It involves three linearly arranged conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

Manipulators of this type or also robots associated with the layer-forming belts can be designed as multi-axis robots, for example, such as are known from DE 10 2009 026 220 A1, for instance, in the context of grouping articles or beverage containers. A frequently used variant of such manipulators are so-called gantry robots, which are often employed in a modular structure in packaging lines, in grouping units, or in palletizing stations. A conveyor belt extending horizontally in longitudinal direction of the conveying level, or a different endlessly circulating means, are types of frequently used transport means or conveying units, on which the objects and/or packages are disposed in predetermined or in randomly assumed positions. Such a module is known, for example, from DE 10 2009 043 970 A1. The gantry robots that are typically employed in such modules, as known, for instance, from DE 10 2010 020 847 A1, can be equipped with gripping apparatuses, for example, for lateral seizing of the piece goods to be handled or manipulated.

Optical monitoring devices which are used to control a handling robot for the seizing and positioning of piece goods in connection with their transport, positioning and/or stacking are known from WO 2014/110349 A1. However, a permanent control based on the optical detection of the piece goods is provided, which requires a high computing and control effort.

DE 602 00 953 T2 reveals a method and system for the automatic and continuous production of layers of sales units before palletizing. The layers are formed by robots, the exact positioning of which is determined by incremental encoders assigned to the conveyors used to transport the sales units. Such couplings by means of incremental encoders, however, entail the risk that inaccurate positioning of piece goods may result in deviations in the assignment. In addition, incorrect positioning of piece goods can add up, so that further measures may be necessary for exact movement control of the robots.

All these known handling systems primarily aim for precise positioning of piece goods, packages, bundles, and/or articles in order to ensure, as far as possible, a failure-free and reliable preparation for layer forming, palletizing, and/or packaging. A secondary object that is, however, becoming increasingly important, lies in reducing the cycle times in this process without reducing the already achieved degree of precision and without having to accept decreases in terms of the reliability already achieved.

In view of the known prior art an aim of the present invention is to enable processing and handling of piece goods, which are conveyed or transported in at least one row, with exact and precise positioning. Within the seizing range of a manipulator the position of the supplied piece goods should always correspond to a predefined ACTUAL position in order to enable precise seizing of the piece goods by the manipulator, in particular without having to intervene in the movement control of the manipulator and without requiring a great deal of computing effort and/or control effort.

The method is moreover intended to run at high speed without creating disadvantages in terms of piece good positioning precision and/or piece good manipulation reliability. The corresponding device shall be capable of being operated quickly and with little computing effort and/or control effort for the movement control of a manipulator, all this with high reliability and consistently high positioning precision.

These objects of the invention are achieved by the subject matter of the independent claims. Features of advantageous further developments of the invention are indicated in the respective dependent claims.

SUMMARY OF THE INVENTION

The invention relates to an apparatus or handling apparatus and a method for handling moving piece goods. If therefore in some passages a method, a method variant, the method according to the invention or the like is referred to in the context of the present description, this is intended to generally mean the mentioned method for handling moving piece goods. This preferably concerns a method for handling piece goods moved one after the other in at least one row. If, furthermore, in some passages an apparatus, a handling apparatus, an apparatus variant, an apparatus according to the invention or the like is referred to in the context of the present description, this is intended to generally mean the mentioned apparatus for handling moving piece goods, especially for handling piece goods moved one after another in at least one row. If handling of piece goods is referred to in the following description, in the descriptive passages relating to embodiments of the invention, in the claims and/or in connection with the entire disclosure comprising the figures and respective description, this is intended to comprise handling, seizing, positioning, moving in space, rotating, aligning, etc., in particular in the context of a manipulator and/or movable parts of the manipulator that are disposed in a seizing space or seizing range and that can move there within definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

If an unchanged or new alignment of the piece goods after the seizing and/or handling is referred to in the context of the presently described apparatus and presently described method, this is intended to mean, in particular, the angular alignment of piece goods that are previously seized and moved and/or shifted and/or rotated by the manipulator. Seizing in the present context usually means gripping a piece good or gripping a plurality of piece goods simultaneously in a physical, form-locking and/or force-locking and/or clamping manner, as well as the handling thereof up to the point of reaching a target position and/or target alignment.

According to a preferred embodiment, the moving piece goods can be articles, packaging items, container assemblies, bundles, cartons, or the like moved one after another in at least one row. It can be provided, for example, that a plurality of articles of the same or of different kinds are gathered together in a bundle or in a mixed bundle by an external cardboard packaging, by a strapping tape or by a plurality of strapping tapes, by a film packaging, or the like. Furthermore, a plurality of beverage containers held together, for example, by a shrink wrap, by a strapping tape or a plurality of strapping tapes, can in each instance form one piece good for the purposes of this definition. In this context the piece goods moved one after another in at least one row can be designed to be the same or to be different, according to requirements of subsequent handling apparatuses.

The at least two immediately consecutive piece goods in a row without spaces or with minimal spaces being moved and/or being conveyed to an area—referred to, in particular, as manipulating range or seizing range—are transported as a closed formation. The term "closed formation" is intended to mean a largely unspaced succession of piece goods transported one after another. The closed formation in the sense of the present invention can be of finite length and comprise a limited number of piece goods, whereupon a space can follow, and upon such a space another such formation can follow which is subsequently transported. Such a sequence can be repeated, too, if applicable, a plurality or a multitude or an undefined number of times. According to a preferred embodiment, the closed formation can also be transported on the at least one transport device and be supplied to the horizontal conveying device as an endless formation. Such an endless formation comprises an optional number of piece goods arranged one after the other within a row without any spaces in between and especially has no interruption between the piece goods. At least one transported piece good is seized from this closed formation in a clamping and/or force-locking and/or form-locking manner; is spatially separated from the closed formation; and is brought into a specified relative target position and/or target alignment in relation to subsequent piece goods of the formation. If "seizing" of piece goods in a "clamping manner" is referred to in the context of the present invention, this is intended to also comprise seizing, gripping, or receiving piece goods in a force-locking and/or friction-locking manner. All the variants of receiving, seizing, and/or gripping piece goods can be likewise combined with seizing, gripping, or receiving the piece goods in a form-locking manner. If a "target position" and/or "target alignment" is referred to in the context of the present invention, this is intended to mean, in particular, that the piece goods are seized, shifted, and/or rotated; and it is also possible that the piece goods are optionally only shifted (without rotation) or only rotated (without shifting movement).

It is preferably provided that in the moment of seizing at least one piece good, there is no back pressure or at the most a very small back pressure between this piece good and the directly following piece goods of the formation. If a back pressure does build up while the piece goods are advanced, this back pressure is preferably dissipated by suitable means prior to the seizing of at least one piece good; this can be achieved, for example, by selecting a suitable surface of the transport device for the piece goods moved in a row one after another. In particular, it can be provided that the surface of the at least one infeeding transport device is rubberized in order to prevent slipping of the piece goods on the transport device or in order to dissipate or at least significantly reduce the back pressure of the constantly infeeding formation or piece good row.

The apparatus for handling moving piece goods comprises at least one transport device for feeding the piece goods to a seizing range of at least one manipulator of the apparatus in the manner described above. The transport device, for example, is a horizontal conveyor, in particular a horizontal conveyor belt. From the transport device the piece goods are further conveyed to a horizontal conveying device, being in particular in alignment with the transport device, whereupon they are seized and in particular also released by the manipulator of the handling apparatus within the seizing range. The horizontal conveying device and the manipulator with its seizing range in particular form the grouping module of the handling apparatus.

According to an embodiment the transport device and the horizontal conveying device can be formed by aligned conveyor belts. Alternatively, the terms transport device and horizontal conveying device can also be used for successive transport sections of a continuous conveyor belt.

In the context of the present invention the seizing range defines in particular a movement range of the at least one manipulator of the apparatus according to the invention. The at least one manipulator is typically and/or preferably designed to seize and/or receive in each instance at least one piece good in a clamping and/or form-locking and/or force-locking manner, the piece goods being supplied in a row of piece goods transported one after the other via at least one transport device into the seizing range of the manipulator. Furthermore, the manipulator is designed for separating and selectively transferring the at least one seized piece good into a target position and/or target alignment.

According to an embodiment at least two clamping elements and/or gripping elements arranged opposite each other, in particular in pairs opposite each other and adjustable against one another can be assigned to the at least one manipulator, which clamping elements and/or gripping elements cooperate with one another, in particular in pairs with one another, to seize the respective piece goods in a clamping and/or form-locking and/or force-locking manner as well as to separate the seized piece goods and selectively transferring them in the target position and/or target alignment. During the seizing of the piece goods, the clamping elements and/or gripping elements of the manipulator are aligned parallel to the transport direction of the infeeding piece goods.

From the piece goods especially supplied in a row as a closed formation, at least one moving piece good is seized by the manipulator within the seizing range of the at least one manipulator in a clamping and/or form-locking and/or force-locking manner, then the piece goods is spatially separated from the subsequent piece goods and brought into a defined relative target position and/or target alignment with respect to the subsequent piece goods. This takes place in particular in a continuous process in which the supply of subsequent piece goods is continued and not interrupted. The piece goods are released by the at least two clamping elements and/or gripping elements arranged opposite one another after being brought into their respective defined target position. The clamping elements and/or gripping elements, which can be adjusted in relation to each other, permit rapid seizing, displacement, positioning and release of the piece goods at the desired speed with the desired positioning precision. Other manipulators can also be used advantageously, e.g. those which are designed as multi-axis robots, as parts of such multi-axis robots, as parallel kinematic robots, as delta kinematic robots or so-called tripods or as manipulators forming part of a delta kinematic robot or a parallel kinematic robot.

Here at least space coordinates and/or position data and/or contour data of at least one piece good of the piece goods being moved in the transport direction to the seizing range are sensory detected by a detection device before the seizing of the at least one piece good by the manipulator and preferentially made available as a position value to a control device or a control unit and/or analysis unit. The data collected by the detection device are used to calibrate and/or control the at least one horizontal conveying device and/or the at least one transport device on the basis of the space coordinates and/or position data and/or contour data.

According to an embodiment of the invention at least one transport device and at least one horizontal conveying device can be synchronously controlled so that the movement of the piece goods supplied on the transport device and the movement of the piece goods continued on the horizontal conveying device are equally regulated.

According to an embodiment of the invention the at least one detection device can be an optical detection device, especially a movably designed optical detection device which is spatially and/or functionally assigned to the seizing range and/or a movement space of the at least one manipulator. Alternatively, it may be provided that the detection device is assigned to the transport device or to the transition section between the transport device and the horizontal conveying device.

The movable optical detection device is movable in particular in a movement range parallel to the transport direction of the piece goods on or parallel to a horizontal conveying device of the grouping module arranged in the seizing range of the manipulator. The movement range is limited by a starting point and an end point and thus defines the detection range of the optical detection device. In order to implement the movement of the optical detection device in the transport direction or opposite to the transport direction the optical detection device is arranged, for example, on a carriage or a trolley which can be moved along a rail, along a toothed belt drive or the like, the rail being arranged parallel to the piece goods moving within a row in alignment one after the other and the rail being arranged next to or above the horizontal conveying device. In particular, the optical detection device can be moved within the movement range between the starting point and the end point.

According to an embodiment, the movement range or detection range of the optical detection device covers the entire seizing range of the manipulator. In particular, the optical detection device may be moved parallel to the entire length of the horizontal conveying device of the grouping module. The movement of the optical detection device is preferably not mechanically coupled to the movement of the manipulator or to the movement of at least one horizontal conveying device. In particular, the optical detection device is assigned its own independent drive. According to one embodiment, the optical detection device is linearly movable, while the manipulator is movable within at least one plane of movement, preferably while the manipulator is movable within a three-dimensional space. As will be described in more detail below, an electronic coupling between the horizontal conveying device and the detection device or the optical detection device can be provided via the control device or via the control unit and/or analysis unit. Furthermore, an electronic coupling may be provided between the at least one transport device and the detection device or the optical detection device as well as between the manipulator and the detection device or the optical detection device.

Especially the at least one horizontal conveying device and/or further conveyor components of the apparatus, for example the transport device via which the piece goods are fed into the seizing range, can be calibrated and/or controlled on the basis of the determined space coordinates and/or position data and/or contour data. Furthermore, the determined data can also be used in feedback of the position of the movable optical detection device. For example, the acquisition of a space coordinate or of a corresponding position data and/or contour data can trigger an activation or deactivation of the optical detection device, or trigger the simultaneous movement of the optical detection device with the transport device and/or horizontal conveying device, or the like. As soon as deviations in the piece good dimensions and/or the conveying speed etc. are detected, this can be constantly corrected as described in more detail below, that is for all subsequent cycles or manipulation steps.

During gapless feeding of piece goods within a closed formation, process-related small gaps may occur between the piece goods on the transport device. If such gaps add up, there is a particular risk that the incoming piece goods will shift in relation to the defined seizing position of the manipulator, so that the manipulator can no longer correctly seize the at least one piece good to be manipulated or the group of piece goods to be manipulated in each instance. This may lead to malfunctioning of the handling apparatus.

In order to prevent the manipulator from incorrectly seizing the at least one piece good, the sensory-determined data are used, for example, to constantly recalibrate and align the positioning of the piece goods on the conveying devices, in particular the horizontal conveying device and/or the transport device, during the ongoing operation so that the manipulator can reliably seize the respectively required number of piece goods.

In accordance with a preferred embodiment of the invention, the apparatus for this purpose comprises a control device or control unit and/or analysis unit for regulating and/or controlling the detection device or the optical detection device and/or for regulating and/or controlling the at least one transport device supplying piece goods preferably in closed formation and/or for regulating and/or controlling the at least one horizontal conveying device assigned to the seizing range and/or for regulating and/or controlling the at least one manipulator.

In accordance with an embodiment of the invention, it is provided that a defined number of parallel, directly adjacent, individually controllable horizontal conveying devices are assigned to the seizing range of the at least one manipulator, whereby the number of horizontal conveying devices corresponds to the number of transport devices via which piece goods are supplied to the seizing range of the at least one manipulator. For example, piece goods are fed gaplessly in parallel rows via at least two parallel transport devices into the seizing range of the at least one manipulator and are continued on the same number of horizontal conveying devices within the seizing range of the at least one manipulator. In particular, within the seizing range of at least one manipulator a horizontal conveying device is aligned with each infeeding transport device.

In accordance with an embodiment of the invention, a movable optical detection device is associated with each horizontal conveying device, which optical detection device is prepared and equipped for obtaining space coordinates and/or position data and/or contour data of at least one moving piece good arranged in the first position in the transport direction of a row of piece goods, which row is arranged on the associated respectively aligned transport device.

In particular, each of the at least two parallel horizontal conveying devices and thus each row of piece goods, in particular those fed in a closed formation without gaps, is assigned its own detection device or its own movable optical detection device. After the manipulator has seized at least one piece good from a row, the ACTUAL position of the now foremost located piece good from this row is determined by the respectively assigned detection device or the respectively assigned optical detection device. In particular, the detection device or the optical detection device is moved parallel to the transport direction of the transport device and/or of the horizontal conveying device or opposite to the transport direction of the transport device and/or of the horizontal conveying device until the corresponding parameters of the now foremost located piece good of the respective row arranged on the infeeding transport device and/or on the continuing horizontal conveying device are detected. Subsequently the determined ACTUAL position of the piece good is compared with a defined NOMINAL position and if necessary, a deviation between the ACTUAL position and the NOMINAL position is determined. For example, the measured data are transmitted to the control device which carries out the comparison between the ACTUAL position and the NOMINAL position and then regulates and/or controls the conveyor components of the apparatus accordingly.

Preferably, each of the horizontal conveying devices has its own drive, so that each of the horizontal conveying devices can be controlled independently of the other(s). In accordance with an embodiment of the invention, in the event of a deviation between the ACTUAL position and the NOMINAL position of the now foremost located piece good, i.e. in the event of a so-called offset, the horizontal conveying device, upon which the respective row of piece goods is arranged, is controlled and/or regulated accordingly. If in the transport direction the determined ACTUAL position is behind the theoretical NOMINAL position, the horizontal conveyor is temporarily accelerated, especially for a short time. Thereby the position of the now foremost located piece good and the subsequent piece goods of the row are corrected relative to the manipulator. In particular, the now foremost located piece good is brought into the defined NOMINAL position in relation to the manipulator. If, on the other hand, the determined ACTUAL position is located in the transport direction in front of the theoretical NOMINAL position, the horizontal conveying device is temporarily decelerated or stopped in particular for a short time, in order to bring the now foremost located piece good into the defined NOMINAL position relative to the manipulator.

Furthermore, according to an embodiment each of the transport devices can be provided with its own drive, so that each of the transport devices can be controlled independently of the other(s). Preferentially, a transport device can be regulated/controlled jointly/synchronously with the horizontal conveying device arranged in alignment with this transport device, in particular this can be done on the basis of the space coordinates and/or position data and/or contour data detected by the associated movable optical detection device. This means that the velocity alteration of the belt speed of the horizontal conveying device that is triggered as a result of a position deviation is also imparted analogously onto the infeeding transport device. This is in particular necessary in the event of an increase in speed of the horizontal conveying device in order to prevent the formation of a gap between the subsequent piece goods within the row in the transition region between the horizontal conveying device and the transport device or that in the event of deceleration or brief stopping of the horizontal conveying device back pressure is generated by the subsequent piece goods of the row in the transition area between the horizontal conveying device and the transport device.

According to a further embodiment, a transport device and a horizontal conveying device arranged in alignment with the transport device can be technically connected as a transport unit and in particular driven by a common drive.

After the manipulator has seized and spatially separated at least one piece good of the row, the optical detection device moves to the theoretical NOMINAL position of the now foremost located piece good and determines its exact ACTUAL position on the horizontal conveying device, in particular the ACTUAL position of the foremost located piece good in relation to the manipulator. Depending on the starting position of the optical detection device, it may be necessary for the optical detection device to move in the transport direction or in the direction opposite to the transport direction. It is also possible that the detection device first moves in the wrong direction. In this case, correction mechanisms may be provided by the control device or by the control unit and/or analysis unit in order to provide a rapid directional correction.

If, for example, the ACTUAL position of the now foremost located piece good is located in the transport direction behind the NOMINAL position and if the optical detection device is located in a position between the ACTUAL position and the NOMINAL position, the seizing of a piece good arranged in front of the now foremost located piece good by the manipulator would trigger a movement of the optical detection device in the transport direction. Preferably, the detection device does not only detect certain parameters of the foremost located piece good but also generally detects the presence or absence of piece goods. Since in the described situation no piece goods are detected at the starting position of the optical detection device, the control device corrects the movement direction of the optical detection device in such a way that the optical detection device is moved opposite to the transport direction in order to determine the correct ACTUAL position of the now foremost located piece good.

When in the context of position detection or the calibration process the movable optical detection device is mentioned, this optical detection device may, for example, be formed by a movably constructed and/or movably arranged light barrier, a movably constructed and/or movably arranged laser edge scanner or another movably constructed and/or movably arranged detection device, which optical detection device is suitable for detecting certain parameters of a piece good and/or certain parameters of a group of piece goods, in particular space coordinates and/or position data and/or contour data. When a movable light barrier is used, this preferably has an optical path that is aligned to be transverse to the transport direction of the piece goods and approximately horizontal and/or parallel to a support plane and/or transport plane of the horizontal conveying device. An interruption of the optical path indicates, for example, the presence of a piece good within the detection range of the optical detection device.

The light barrier arrangement is preferably formed by a reflection light barrier for detecting light-dark contrasts within a definable distance range from a transmitter/receiver. This is particularly advantageous for the processing of piece goods moving in two rows on two parallel horizontal conveying devices, whereby an optical detection device is provided on both sides of the seizing range of the at least one manipulator. Each of the optical detection devices is set in such a way that it only ever detects piece goods of the respective assigned row. The at least one manipulator picks up piece goods from one of the two rows according to a defined scheme in order to arrange and/or align them in accordance with a layer scheme to be formed. After the seizing the ACTUAL position of the now foremost located piece good of a row is detected and used for correcting the position of the piece goods infeeding on the horizontal conveying device and on the transport device as has been described above.

If instead of a light barrier a so-called edge scanner is used, which provides the control unit and/or analysis unit with space coordinates and/or position data and/or contour data, in particular even more detailed position data can be obtained, for example, an inclined position and/or other incorrect positioning of one of the piece goods which can be corrected, if necessary, during seizing by the manipulator. For example, an edge scanner of this type is used to obtain space coordinates and/or position data and/or contour data for the in each instance foremost located piece good, especially a contour edge facing forward or backward in relation to the transport direction.

In accordance with a further embodiment, at least one camera with downstream image evaluation is used as optical detection device, from the data of which the control unit and/or analysis unit obtains space coordinates and/or position values and/or contour values for a moving piece good, in particular space coordinates and/or position values and/or contour values for the in each instance foremost located piece good and/or for the piece good's contour edge facing forward.

The listed optical detection devices or sensor devices are to be understood by way of examples. In principle, however, other sensor variants can also be used, e.g. ultrasonic sensors or similar. Other suitable sensors can also be used advantageously by a person skilled in the art.

According to an embodiment of the invention the embodiment essentially serves for the constant and/or cyclical or irregular recurring calibration of a horizontal conveying device of an apparatus or handling apparatus according to the invention as described above. Preferably, an embodiment of the present invention also serves the purpose of constant and/or cyclical or irregular recurring calibration of a transport device of the apparatus or handling apparatus according to the invention, the transport device being arranged in alignment to the horizontal conveying device and supplying piece goods moving in a row. The piece goods to be handled and to be positioned are preferentially transported in rows as closed formation to the seizing range of the manipulator. The manipulator can simultaneously seize, for example, a maximum of two, three or more incoming piece goods. These piece goods, for example, can include 2×3 beverage containers or the like grouped together by an outer packaging.

Furthermore, it may be provided that the transport device and/or the horizontal conveying device can temporarily, in particular briefly, perform a backward movement, i.e. a movement opposite to the transport direction of the piece goods. Such a movement into the opposite direction can serve as compensation movement, e.g. to close unwanted gaps or similar.

The invention furthermore concerns a conveying, processing, and/or packaging plant for piece goods with an apparatus for handling moving piece goods as described above. Conveyor lines and/or manipulation stations for arranging the piece goods into configurations that are processable by the apparatus are arranged upstream of the described apparatus for handling moving piece goods and at least one palletizing station for arranging the piece goods that have been grouped and/or brought into layer arrangements by the apparatus is disposed downstream from the described apparatus.

The at least one movable optical detection device assigned to the seizing range and/or to a movement range of the at least one manipulator of the apparatus for handling moving piece goods, which optical detection device is prepared and equipped for obtaining space coordinates and/or position data and/or contour data of at least one piece good that is being moved in transport direction, has an independent drive that is, in particular, independent of the at least one transport device by which the moving piece goods are transportable to the seizing range of the at least one manipulator and/or that is independent of the at least one horizontal conveying device and/or that is independent of the at least one manipulator.

The movement of the optical detection device is preferably not mechanically coupled to the movement of the at least one horizontal conveying device and/or the at least one transport device and/or the movement of the manipulator, but is mechanically independent. However, an electronic coupling may be provided between the at least one horizontal conveying device and/or the at least one transport device and/or the manipulator and the optical detection device, in which corresponding signals from the manipulator can trigger a movement of the optical detection device in the transport direction or opposite to the transport direction and/or an activation or deactivation of the optical detection device.

The space coordinates and/or position data and/or contour data determined by the optical detection device are used at least for calibrating and/or controlling the at least one horizontal conveying device and/or the at least one transport device of the apparatus for handling moving piece goods. The data can also be used, for example, to continuously recalibrate other machine components of the conveying, processing, and/or packaging plant, for example conveying devices upstream or downstream of the apparatus, the palletizing station downstream of the apparatus, etc., in order to ensure a trouble-free operation of the plant.

A particular advantage of the apparatus according to the invention, the method according to the invention and the conveying, processing and/or packaging plant according to the invention lies in the fact that the optical detection device delivers good, reliable values that can be used to quickly adapt the position of the piece goods on the at least one horizontal conveying device and/or on the at least one transport device, the movement of the manipulator and/or further conveying components and/or plant components, so that errors arising from adding up small unwanted gaps between the incoming piece goods or groups of piece goods can be corrected directly.

The method may include, alternatively or in addition to the characteristics described, one or more characteristics and/or properties of the apparatus described above. The apparatus may also alternatively or additionally have one or more characteristics and/or properties of the described method.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 1 to 7 schematically show a chronological sequence of an inventive method for handling piece goods moved one after the other in two parallel rows by a corresponding handling apparatus.

Figure 1:
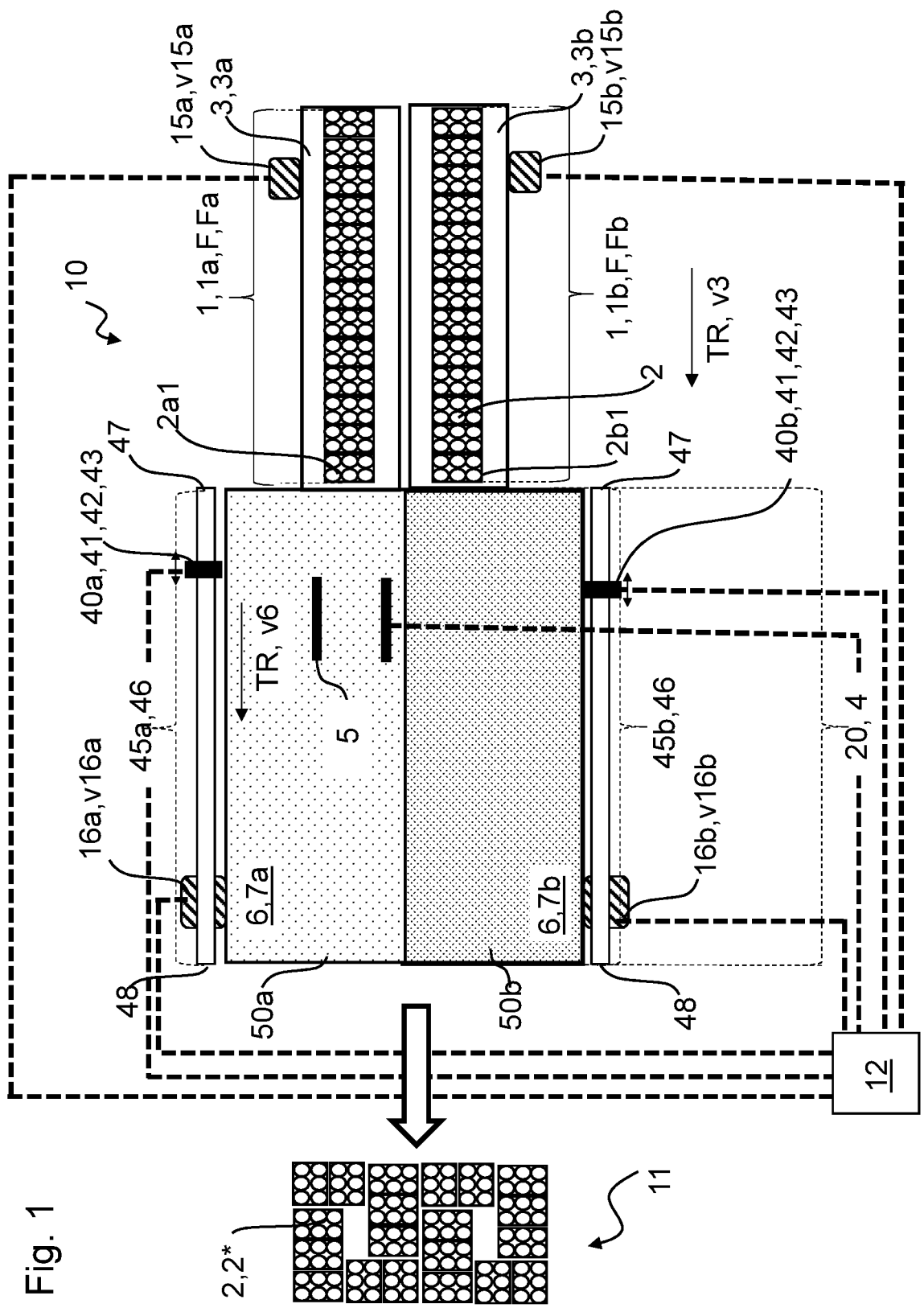

The same or equivalent elements of the invention are designated using identical reference characters. Furthermore, and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

DETAILED DESCRIPTION OF THE INVENTION

FIGS. 1 to 7 schematically show a chronological sequence of an inventive method for handling piece goods 2 moved one after the other in two parallel rows 1, 1a, 1b with an automated position detection/calibration of the piece goods 2 supplied in row 1, 1a, 1b within a grouping module 20 of a corresponding handling device 10. Piece goods 2 in terms of the described embodiment are bundles consisting of six beverage containers, which are held together, for example, with a shrink packaging.

The handling apparatus 10 comprises two first transport devices 3, 3a, 3b arranged in parallel, by which immediately successive piece goods 2 are transported in two parallel rows 1, 1a, 1b in the transport direction TR without interruption and/or at an essentially continuous transport speed v3 into a seizing range 4 of at least one movable, displaceable and/or rotatable manipulator 5 of the handling apparatus 10. In particular, it is provided that the two parallel first transport devices 3a, 3b are assigned to exactly one seizing range 4 of one single manipulator 5 of the handling apparatus 10. The transport devices 3a, 3b are each formed, for example, by a conveyor belt or another suitable conveying device, on which the piece goods 2 are preferably transported in a single row, whereby there is no or only a slight gap between immediately successive piece goods 2, the gap possibly being process-related. The piece goods 2 thus enter into the seizing range 4 of the manipulator 5 in a so-called closed formation F, Fa, Fb within each of the rows 1a, 1b.

FIG. 1 shows an example of a layer 11 to be formed from piece goods 2. Within the grouping module 20, a group of piece goods 2 each gripped is and shifted, rotated or similar by the manipulator 5, for example a gripper, in order to form a palletizable layer 11 or a pre-grouping for a palletizable layer 11. FIGS. 2 to 7 schematically illustrate the first procedural steps for arranging the piece goods 2, 2* in order to form a layer 11.

Each of the two infeeding transport devices 3, 3a, 3b can be assigned its own drive 15a, 15b, so that the two transport devices 3a, 3b can be controlled independently of each other. Usually the two transport devices 3a, 3b are operated with the same constant speed v3; in the event of an irregularity in the gapless supply of piece goods 2, this can be corrected by briefly adjusting the respective belt speeds v15a or v15b.

Two parallel horizontal conveying devices 6 are arranged within the grouping module 20, for example, a first grouping belt 7a and a second grouping belt 7b, and are assigned in particular to the seizing range 4 of the manipulator 5. The piece goods 2 supplied by the first transport device 3a are transferred to the first grouping belt 7a and transported further thereon and the piece goods 2 transported on the second transport device 3b are transferred to the second grouping belt 7b and transported further thereon. An own drive 16a, 16b is assigned to each of the two grouping belts 7a, 7b, so that the two grouping belts 7a, 7b can be regulated independently of each other and/or independently of the respective infeeding transport devices 3a, 3b. Usually the two grouping belts 7a, 7b are operated at the same constant speed v6; in the event of an irregularity in the gapless supply of piece goods 2, this can be corrected by briefly adjusting the respective belt speeds v16a or v16b.

The manipulator 5 is designed for receiving piece goods 2, 2* or in a clamping and/or form-locking and/or force-locking manner within the seizing range 4 of the grouping module 20. For example, the manipulator 5 grips at least one piece good 2 within its seizing range 4 or according to FIG. 2 the manipulator 5 grips at least at least two piece goods 2 arranged one after the other from the closed formation Fa supplied by the first transport device 3a, separates the at least one piece good 2 from the single-row formation Fa and transfers the separated piece good 2* or the separated group of two piece goods 2* arranged in a gapless row into a first target position P1 and/or target orientation (see FIGS. 3 to 5). Thereby, the group of piece goods 2* is distanced by the manipulator 5 from the formation Fa of piece goods 2 in the transport direction TR, furthermore the group of piece goods 2* can be rotated with respect to the piece goods 2 of the formation Fa; in particular in FIGS. 3 to 5 a counterclockwise rotation by 90° of the separated group of two piece goods 2* arranged in a gapless row is shown.

Figures 2, 3:
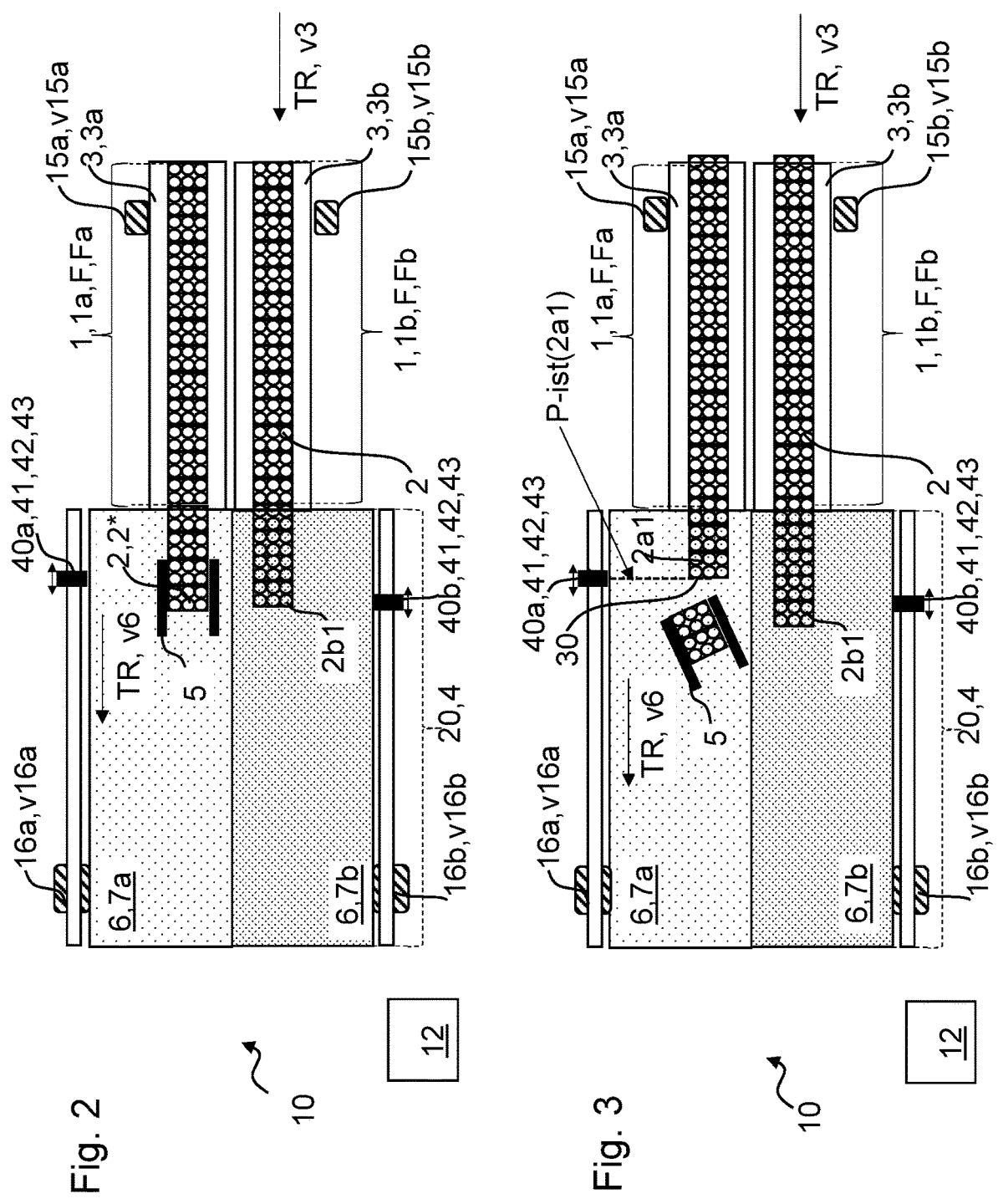

FIG. 2 shows the gapless transport of row 1 or formation F continuing in transport direction TR within the seizing range 4 of handling apparatus 10, i.e. in particular the gapless continuing transport of row 1 or formation F of piece goods 2 within the grouping module 20. In particular, the piece goods 2 of the respective rows 1a, 1b are transported within the seizing range 4 essentially without interruptions and at an unchanged transport speed, i.e. the speed v6 of the two horizontal conveying devices 6 corresponds essentially to the transport speed v3 of the two transport devices 3a, 3b. The piece goods 2 arriving in parallel rows 1a, 1b via the transport devices 3a, 3b are pushed onto the horizontal conveying devices 6 or grouping belts 7a, 7b respectively by the back pressure of the subsequent piece goods 2 and are transported further on without interruptions.

FIGS. 3 to 5 show a seizing of two piece goods 2 from the formation Fa by the manipulator 5. In particular, the manipulator 5 seizes the first two piece goods 2 of the formation Fa. For example, the manipulator 5 is lowered from above onto the piece goods 2 to be seized and grasps them. The piece goods 2 seized by the manipulator 5 are referred to below with the reference characters 2* for the purpose of distinguishing them from the piece goods 2 of the formation F. The manipulator 5, for example, is a gripper head with lateral clamping jaws or similar, which according to the shown embodiment attaches itself to the first two piece goods 2 of formation Fa, seizes them in a clamping and/or form-locking manner and separates them from the formation Fa. The piece goods 2* are subsequently moved by the manipulator 5 into a defined relative target position P1 (see FIG. 5) in relation to subsequent piece goods 2 of the formation Fa. Hereby, the piece goods 2* are rotated so that the target alignment of the piece goods 2* is changed in relation to the alignment of the piece goods 2 of the formation Fa.

Preferably, the seized piece goods 2* are transferred, shifted and/or rotated to the target position P1 and/or target alignment in one single, in particular, interruption-free manipulation step. Here it can be provided, for example, that the manipulator 5 lifts up the seized piece goods 2*, transports them to the target position P1 and sets them down again within the seizing range 4 on the corresponding horizontal conveying device 6 or grouping belt 7a, 7b. Alternatively, it may be provided that the manipulator 5 shifts the piece goods 2* on the corresponding horizontal conveying device 6 or on the corresponding grouping belt 7a, 7b in particular by applying a speed component and/or a direction component to the seized piece goods 2*.

In the manipulation steps described here it is intended in particular that at least when the two piece goods 2* are seized and when they are released in the target position P1 and target orientation the manipulator 5 moves at a speed which corresponds approximately or exactly to the transport speed v3 at which the closed formation F of the piece goods 2 moves.

The target position P1 is, in particular, a relative position in relation to the formation Fa. Since the transport device 3a and thus the formation Fa move at essentially the same speed as the horizontal conveying device 6 or the grouping belt 7a, 7b the relative distance between the piece goods 2* in the target position P1 and a piece good 2 of the formation Fa not yet seized by the manipulator 5 always remains the same in the further process, even though all piece goods 2, 2* are continuously moving on.

Since, however, deviations between a theoretical NOMINAL position of a foremost located piece good 2a1, 2b1 of a row 1a, 1b and its ACTUAL position may occur due to process related reasons and/or due to deviations in the dimensions of the piece goods 2 and/or due to undesired distances between the piece goods 2 within the gapless supply, it is advantageous to determine the exact position of each foremost located piece good 2a1, 2b1 of the row 1a, 1b directly in before and/or within the grouping module 20 and to correct the position if necessary. A correction of the position of the incoming piece goods 2 is possible within the grouping module 20, in particular on the basis of a measured ACTUAL position of the respectively foremost located piece good 2a1, 2b1 in combination with known process parameters, for example with the transport speed v3 of the rows 1a, 1b on the infeeding transport devices 3a, 3b or the speed v6 of the piece goods 2 on the respective horizontal conveying devices 6 or grouping belts 7a, 7b of the grouping module 20. This is to ensure that the piece goods 2, 2* to be manipulated are always in a position in which they can be gripped correctly in accordance with the predefined motion sequence of the manipulator 5 and can be shifted, rotated and/or otherwise manipulated correspondingly.

The position detection is carried out independently for each incoming row 1a, 1b, preferably with the aid of a movable sensor 40a, 40b. This sensor may, for example, be a movably constructed and/or arranged laser edge scanner 42 or another suitable movably constructed and/or arranged optical detection device (like a light barrier arrangement 41 or a camera 43) which is suitable for optically detecting certain parameters of a foremost located piece good 2a1, 2b1 of the row 1a, 1b, which row 1a, 1b is respectively assigned to the sensor 40a, 40b.

The movable sensors 40a, 40b are particularly each movable within a movement range of 45a, 45b parallel to the transport direction TR of the piece goods 2 on or parallel to the grouping belts 7a, 7b of the grouping module 20. The movement ranges 45a, 45b are each limited by a starting point 47 and an end point 48 and thus define the respective detection range 50a, 50b of the sensor 40a, 40b. The sensors 40a, 40b, for example, each are arranged on a carriage which can be moved parallel to the transport direction TR of the piece goods 2 between the starting point 47 and the end point 48 within the respective movement range 45a, 45b via a running rail 46, a toothed belt drive or similar. The movement range 45, the running rail 46, the starting point 47, the end point 48 and the detection ranges 50a, 50b are shown in particular only in FIG. 1 to improve the clarity of the presentation. The sensors 40a, 40b are in particular not mechanically coupled to the manipulator 5. Furthermore, the movability of the sensors 40a, 40b is not coupled to the movability of the manipulator 5. In particular, the sensors 40a, 40b each comprise their own drive (not shown) via which drive the sensors 40a, 40b can be moved independently of each other, preferably parallel to the transport direction TR of the incoming piece goods 2 or opposite to the transport direction TR of the incoming piece goods 2.

The movable sensor 40a, 40b detects at least one specific parameter of each piece good 2a1, 2b1 which first enters the detection range 50a, 50b (see FIG. 2). If a laser edge scanner 42 is used, especially further and/or more detailed position parameters and/or location parameters of the respectively detected piece goods 2 can be determined such as incorrect positioning or the like. For example, the sensor 40a, 40b detects a forward-facing edge 30 of the respective leading piece good 2a1, 2b1 (see FIG. 3).

The sensors 40a, 40b are used to detect the position of the foremost incoming piece good 2a1, 2b1 within the grouping module 20, the piece goods 2 arriving in closed formation Fa, Fb in the rows 1a, 1b, and to compare this respectively determined ACTUAL position P-ist(2a1) (cf. FIG. 3) or P-ist(2b1) (cf. FIG. 7) with a predefined theoretical NOMINAL position. For this purpose, the ACTUAL position P-ist(2a1), P-ist(2b1) determined by the sensors is transmitted to a corresponding control device 12. If a deviation between the NOMINAL position and the ACTUAL position is determined, the position of the foremost incoming piece good 2a1, 2b1 and the subsequent piece goods 2 of the respective row 1a, 1b can be corrected within the seizing range 4 within the grouping module 20 by a corresponding change of the speed of the respective grouping belt 7a, 7b.

After the manipulator 5 has seized two leading piece goods 2, 2* of row 1a according to FIG. 2 and separated them from the row 1a according to FIG. 3, the sensor 40a assigned to the grouping belt 7a and thus to the row 1a receives a signal from the control device 12. The signal activates the sensor 40a, which is moved along the running rail 46 of its movement range 45a in the transport direction TR of the piece goods 2 and/or opposite to the transport direction TR of the piece goods 2 until it detects the corresponding parameter of the now foremost located piece good 2a1 of row 1a. The direction in which the sensor 40a moves within its movement range 45a is determined on the basis of the theoretical NOMINAL position and the speed v6 of the grouping belt 7a and other process parameters, if applicable.

If the sensor 40a is located in transport direction TR behind the theoretical NOMINAL position of the now foremost located piece good 2a1 of row 1a then the sensor 40a is moved in transport direction TR at a speed that is higher than the speed v6. In order, for example, to determine the exact ACTUAL position P-ist(2a1) of a forward-facing edge 30 of the now foremost located piece good 2a1 it may be useful for the sensor 40a to be moved in the transport direction TR beyond the forward-facing edge 30 of the foremost located piece good 2a1 and to subsequently perform a correction movement in the opposite direction.

If the sensor 40a is unable to detect a forward-facing edge 30 of a now foremost located piece good 2a1 because this piece good 2a1 is not located in front of the sensor 40a in transport direction TR in accordance with the theoretical NOMINAL position but instead is located behind the sensor 40a due to an error, then after having reached the end point 48 of its movement range 45a the sensor 40a will again move in the direction opposite to the transport direction TR of the piece goods 2 until it finally detects the forward-facing edge 30 of the now foremost located piece good 2a1. If necessary, other correction mechanisms may be provided which already cause a reversal of direction at an earlier point in time, for example, because the sensor 40a does not detect any piece goods 2 during its movement. This is an indication that the sensor 40a must be located in transport direction TR in front of the piece goods 2 of the incoming row 1a.

If, on the other hand, the sensor 40a is located in the transport direction TR in front of the theoretical NOMINAL position of the now foremost located piece good 2a1 of the row 1a, then the sensor 40a is moved in the direction opposite to the transport direction TR. A relatively slow movement speed of the sensor 40a may be sufficient, since the movement of the sensor 40a and the movement of the incoming piece goods 2 of the row 1a is in opposite directions.

Should the sensor 40a not be able to detect a forward-facing edge 30 of a now foremost located piece good 2a1 because this piece good 2a1 is not located in the transport direction TR behind the sensor 40a in accordance with the theoretical NOMINAL position but instead is located in the transport direction TR in front of the sensor 40a due to an error, then after having reached the starting point 47 of its movement range 45a the sensor 40a is now moved in the transport direction TR of the piece goods 2 at a speed significantly higher than the speed v6 until it finally detects the forward-facing edge 30 of the now foremost located piece good 2a1. In this case it can be useful again for the sensor 40a to move in the transport direction TR beyond the forward-facing edge 30 of the now foremost located piece good 2a1 and to subsequently perform a correction movement in the opposite direction.

The ACTUAL position P-ist(2a1) determined by the sensor 40a is transmitted to the control device 12 and compared with the theoretical NOMINAL position. It is self-evident that the value of the theoretical NOMINAL position must be constantly recalculated since the piece goods 2 of row 1a are continuously moved further on the grouping belt 7a.

If the control device 12 determines a deviation between the theoretical NOMINAL position and the measured ACTUAL position P-is(2a1), the position of the foremost incoming piece good 2a1, 2b1 and the subsequent piece goods 2 of the respective row 1a, 1b can be corrected by a corresponding speed change of the respective grouping belt 7a, 7b. Preferably a synchronized speed change of each grouping belt 7a, 7b takes place together with the respectively associated transport device 3a, 3b. If the foremost located piece good 2a1 of row 1a is located in transport direction TR behind the theoretical NOMINAL position, a position correction is carried out by briefly increasing the belt speed v16a. In order to avoid that gaps can form within the transition area between the transport device 3a and the grouping belt 7a within the row 1a of piece goods 2 due to the brief acceleration of the grouping belt 7a, the belt speed v15a of the transport device 3a is also increased synchronously. If, on the other hand, the foremost located piece good 2a1 of row 1a is located in transport direction TR in front of the theoretical NOMINAL position, a position correction is carried out by briefly reducing the belt speed v16a or by briefly stopping the grouping belt 7a. In order to avoid that the brief deceleration of the grouping belt 7a causes the forming of an increased back pressure within the row 1a of piece goods 2 in the transition area between the transport device 3a and the grouping belt 7a, the belt speed v15a of the transport device 3a is also synchronously reduced or stopped.

While according to FIGS. 2 to 5 the manipulator 5 seizes two piece goods 2 from the row 1a, separates them from the row 1a and transfers them to a target position P1, it can be provided according to an embodiment not shown here that the second movable sensor 40b is moved along with the foremost located piece good 2b1 of the row 1b so that the ACTUAL position of the piece good 2b1 is always precisely known. Alternatively, it can be provided that the second movable sensor 40b controls the position of the foremost located piece good 2b1 of the row 1b during this period in defined time intervals, whereby this can be done, for example, by the movement scheme described above.

Alternatively, it can be provided that the sensor 40b determines the exact ACTUAL position of the foremost located piece good 2b1 of the row 1b only immediately before the manipulation step shown in FIG. 6. This means that according to this alternative embodiment it can be provided that the exact ACTUAL position P-is(2b1) of the foremost located piece good 2b1 of the row 1b is determined directly before the seizing and gripping of two piece goods 2* from the row 1b by the manipulator 5.

Analogous to the above description, according to FIGS. 6 and 7 two piece goods 2, 2* of row 1b are seized and gripped in order to move them to a target position (not shown) corresponding to the target layer 10 (see FIG. 1). Subsequently, the sensor 40b receives a signal and is moved along its movement range 45b in order to determine the ACTUAL position P-ist(2b1) of the now foremost located piece good 2b1 of the row 1b.

In accordance with an alternative embodiment not shown here, it may be provided that the seizing range 4 of the manipulator as well as the movement ranges 45a, 45b or detection ranges 50a, 50b of the sensors 40a, 40b only cover a partial range of the conveying surface of the grouping module 20, which conveying surface adjoins the conveying device 3 in the transport direction TR and is formed by the horizontal conveying devices 6. In the adjoining section of the horizontal conveying devices 6 that is located downstream in the transport direction TR, the first steps of a subsequent layer centering can already be carried out within the grouping module 20, for example. In another alternative embodiment not shown here, the sensors 40a, 40b can each have a movement range 45a, 45b which extends beyond the horizontal conveying devices 6 of the grouping module 20. For example, in such a case the sensors 40a, 40b can at least partially move along a section of a layer centering module (not shown) arranged downstream in transport direction TR and, if necessary, acquire certain parameters of the layer to be centered in this section.

The embodiments, examples and variants of the preceding paragraphs, the claims or the following description and the Figures, including their different views or respective individual characteristics, may be used independently of each other or in any combination. Characteristics which are described in connection with an embodiment are applicable to all embodiments, provided that the characteristics are not incompatible Although the embodiment describes a dual-row infeed via two transport devices 3a, 3b and a dual-row continued conveyance via grouping belts 7a, 7b, further embodiments featuring more or less feeding belts are also conceivable for the expert. In particular, the invention can also be used advantageously for layer formation of piece goods supplied in a single row. An application with a multiple row supply would also be conceivable. In this case, the movement range of centrally arranged sensors would have to be selected accordingly so that these sensors do not interfere with the movement of the manipulator 5.

It also goes without saying that although a certain arrangement of the components is disclosed in the embodiment shown, other arrangements can benefit from this. Although certain sequences of steps are identified, described and claimed, it is to be understood that the steps may be performed in any order, individually or in combination, unless otherwise stated, and may nevertheless benefit from this invention.

The invention was described with reference to a preferred embodiment. However, it is conceivable for a person skilled in the art that modifications or alterations of the invention can be made without leaving the scope of protection of the following claims. It is possible to use some of the components or features of one example in combination with features or components of another example.

LIST OF REFERENCE NUMERALS 1,1a,1b row
2,2* piece good
2a1, 2b1 foremost located piece good
3,3a,3b transport device
4 seizing range
5 manipulator
6 horizontal conveying device
7a, 7b grouping belt
10 handling apparatus
11 layer
12 control device
15a, 15b drive
16a, 16b drive
20 grouping module
30 forward-facing edge
Light barrier arrangement
40a, 40b moving sensor
Camera
42 laser edge scanner
45a, 45b movement range
46 running rail
47 starting point
48 end point
50a, 50b detection range
F,Fa,Fb formation
P1 target position
P-ist(2a1) ACTUAL position
P-ist(2b1) ACTUAL position
TR transport direction
v3 transport speed
v6 speed
v15a, v15b belt speed t
v16a, v16b belt speed

The invention claimed is:

1. An apparatus (10) for handling piece goods (2), the apparatus (10) comprising
at least one manipulator (5) for piece goods (2);
at least two transport devices (3) transporting the piece goods (2) to a seizing range (4) of the at least one manipulator (5);
at least two horizontal conveying devices (6) that are parallel, directly adjacent to each other, in each case the at least two horizontal conveying devices (6) are individually controllable, wherein the number of the at least two horizontal conveying devices (6) corresponds to the number of transport devices (3), with each of the at least two horizontal conveying devices (6) assigned to the seizing range (4) of the at least one manipulator (5), wherein the at least two horizontal conveying devices (6) transport the piece goods (2) within the seizing range (4) of the at least one manipulator (5); and
at least one detection device that obtains space coordinates, position data, or contour data for the piece goods (2) to be seized by the manipulator (5);
wherein the at least two horizontal conveying devices (6) and the at least two transport devices (3) are calibratable or controllable based on the space coordinates, position data, or contour data.

2. The apparatus (10) of claim 1, wherein at least two transport devices (3) and at least two horizontal conveying devices (6) are controlled synchronously.

3. The apparatus (10) of claim 2, wherein the at least one detection device is an optical detection device assigned to the seizing range (4) of the at least one manipulator (5).

4. The apparatus (10) of claim 3, wherein the at least one detection device is a movable optical detection device.

5. The apparatus (10) of claim 4, wherein the piece goods (2) are transported in a closed formation via the at least two transport devices (3) to the seizing range (4) of the at least one manipulator (5).

6. The apparatus (10) of claim 5, the apparatus (10) further comprising a control unit or analysis unit (12) for regulating or controlling the at least one detection device or for regulating or controlling the at least two transport devices (3) or for regulating or controlling the at least two horizontal conveying devices (6) or for regulating or controlling the at least one manipulator (5).

7. The apparatus (10) of claim 6, further comprising at least one detection device assigned to each horizontal conveying device (6) or each transport device (3), wherein each detection device obtains space coordinates, position data, or contour data of at least one piece good (2) that is arranged first and foremost in the transport direction (TR) within a row (1).

8. The apparatus (10) of claim 7, wherein each of the transport devices (3) or each of the horizontal transport devices (6) comprises its own drive (15), which can be controlled independently of each other, or wherein a transport device (3) and an aligned horizontal conveying device (6) each form a transport unit, wherein a common drive is associated with the transport unit.

9. The apparatus (10) of claim 7, wherein a transport device (3) and horizontal conveying device (6) arranged in each case in alignment with the transport device (3) can be jointly controlled on the basis of the space coordinates, position data, or contour data detected by the associated detection device.

10. The apparatus (10) of claim 9, wherein the detection device comprises at least one light barrier arrangement (41) with an optical path that is aligned to be transverse to the transport direction (TR) and approximately horizontal or parallel to a support layer or transport layer of the horizontal conveying device (6) or by at least one edge scanner or by at least one camera with downstream image evaluation.

11. The apparatus (10) of claim 4 wherein the movable optical detection device (40) is assigned its own drive that is independent of the manipulator (5) or independent of the at least two transport devices (3) or independent of the at least two horizontal conveying devices (6).

12. A method for handling piece goods (2), comprising:
supplying piece goods (2) in parallel rows (1), via at least two parallel transport devices (3), to a seizing range (4) of at least one manipulator (5), and continuously moving the piece goods (2) in the seizing range (4) on at least two horizontal conveying devices (6), wherein the number of the at least two horizontal conveying devices (6) correspond to the number of the at least two parallel transport devices (3);

sensor-detecting at least space coordinates, position data, or contour data of one of the piece goods (2), moving in a transport direction (TR), with a detection device and providing the at least space coordinates or a position data to a control unit or analysis unit (12);

calibrating or controlling the at least two parallel transport devices (3) or the at least two horizontal conveying devices (6) based on the space coordinates, position data, or contour data; and seizing the at least one transported piece good (2) in the seizing range (4) by the at least one manipulator (5), and spatially separating the at least one seized piece good (2) from subsequent piece goods (2), and bringing the at least one separated piece good (2) into a target position (P1), target alignment, or target position (P1) and target alignment, in relation to the subsequent piece goods (2).

13. The method of claim 12, wherein the at least two parallel transport devices (3) and at least two horizontal transport devices (6) are being controlled synchronously.

14. The method of claim 12, further comprising supplying the piece goods (2) in a row (1) one after the other without spaces therebetween.

15. The method of claim 14, further comprising sensor-detecting, with a separate detection device assigned to each of at least two horizontal conveying devices (6) and thus each row (1) of piece goods (2), wherein, after seizing at least one piece good (2) of a row (1) by the manipulator (5), the ACTUAL position of the piece (2) of this row (1) which is now arranged at the foremost position is determined by the respectively assigned detection device, wherein the ACTUAL position is compared with a defined NOMINAL position and determining a deviation.

16. The method of claim 15, wherein, in the event of a deviation between the ACTUAL position and the NOMINAL position of the foremost arranged piece good (2) of the row (1), controlling or regulating the at least two horizontal conveying devices (6) on which the respective row (1) is arranged.

17. The method of claim 16, wherein the controlling or regulating of the at least two horizontal conveying devices (6) comprises accelerating, decelerating, or stopping the at least two horizontal control devices (6) in order to correct the deviation or a calculated offset, so that the piece good (2) arranged at the front of the row again assumes the defined NOMINAL position on the at least two horizontal conveying devices (6).

18. The method of claim 16, further comprising synchronously regulating or controlling the at least two horizontal conveying devices (6) and the at least two parallel transport devices (3).

* * * * *